(12) United States Patent
Iskander et al.

(10) Patent No.: US 11,057,962 B2
(45) Date of Patent: Jul. 6, 2021

(54) SYSTEMS AND METHODS TO REPORT BAND COMBINATION CAPABILITIES IN A TELECOMMUNICATION NETWORK

(71) Applicant: Apple Inc., Cupertino, CA (US)

(72) Inventors: Shadi Iskander, Unterhaching (DE); Naveen Palle, San Diego, CA (US); Candy Yiu, Portland, OR (US); Birgit Breining, Munich (DE); Youn Hyoung Heo, Seoul (KR); Hesham Elhelw, Munich (DE)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 16/339,143

(22) PCT Filed: Nov. 3, 2017

(86) PCT No.: PCT/US2017/060046
§ 371 (c)(1),
(2) Date: Apr. 3, 2019

(87) PCT Pub. No.: WO2018/085721
PCT Pub. Date: May 11, 2018

(65) Prior Publication Data
US 2019/0306925 A1    Oct. 3, 2019

Related U.S. Application Data

(60) Provisional application No. 62/417,698, filed on Nov. 4, 2016.

(51) Int. Cl.
*H04W 88/10* (2009.01)
*H04W 76/27* (2018.01)
(Continued)

(52) U.S. Cl.
CPC ............. *H04W 88/10* (2013.01); *H04L 5/001* (2013.01); *H04L 5/0094* (2013.01); *H04W 8/24* (2013.01);
(Continued)

(58) Field of Classification Search
CPC ....... H04W 88/10; H04W 76/27; H04W 8/24; H04W 72/0453; H04W 88/06; H04L 5/001; H04L 5/0094
See application file for complete search history.

(56) References Cited

U.S. PATENT DOCUMENTS

| 9,655,121 B2 | 5/2017 | Kim et al. |
| 2013/0095816 A1* | 4/2013 | Gerstenberger .. H04W 72/0406 455/422.1 |

(Continued)

FOREIGN PATENT DOCUMENTS

WO    2016/164081 A1    10/2016

OTHER PUBLICATIONS

International Search Report and Written Opinion dated Jan. 22, 2018 for PCT Application PCT/US2017/060046.
(Continued)

*Primary Examiner* — Duc C Ho
(74) *Attorney, Agent, or Firm* — Eschweiler & Potashnik, LLC

(57) ABSTRACT

Techniques described herein may be used to enable User Equipment (UE) to efficiently and reliably report supported band combinations to a wireless network. An enhanced NodeB (eNB) may determine eNB-supported bands combinations for carrier aggregation scenarios, create a simplified representation of the eNB-supported bands combinations (e.g., using a highest order band combination, groups of band combinations, etc.), and communicate the eNB-supported bands combinations to the UE. The UE may deter-
(Continued)

mine UE-supported band combinations that are among the eNB-supported bands combinations, create a simplified representation of the UE-supported band combinations, and communicate the eNB-supported bands combinations to the eNB. The eNB may use the UE-supported band combinations to allocate appropriate carriers to the UE for carrier aggregation.

24 Claims, 9 Drawing Sheets

(51) Int. Cl.
    H04L 5/00      (2006.01)
    H04W 8/24      (2009.01)
    H04W 72/04     (2009.01)
    H04W 88/06     (2009.01)

(52) U.S. Cl.
    CPC ....... H04W 72/0453 (2013.01); H04W 76/27 (2018.02); H04W 88/06 (2013.01)

(56) References Cited

U.S. PATENT DOCUMENTS

| | | | |
|---|---|---|---|
| 2014/0140318 A1* | 5/2014 | Uemura | H04W 8/24 370/330 |
| 2016/0044730 A1* | 2/2016 | Baghel | H04W 72/02 370/329 |
| 2016/0262053 A1* | 9/2016 | Palm | H04L 5/0092 |
| 2017/0111910 A1* | 4/2017 | Sundar | H04W 72/0453 |

OTHER PUBLICATIONS

International Preliminary Report on Patentability dated May 16, 2019 for PCT Application PCT/US2017/060046.
"Optimization of UE capability signalling." 3GPP TSG-RAN WG4 Meeting #83, Hangzhou, China., May 15-19, 2017, R4-1705126. 8 pages.
3rd Generation Partnership Project; Technical Specification Group Radio Access Network; Evolved Universal Terrestrial Radio Access (E-UTRA); Radio Resource Control (RRC); Protocol specification (Release 14). 3GPP TS 36.331 V. 14.0.0 (Sep. 2016). 3GPP Lte Advanced Pro. 322 pages.

* cited by examiner

SYSTEMS AND METHODS TO REPORT BAND COMBINATION CAPABILITIES IN A TELECOMMUNICATION NETWORK

RELATED APPLICATIONS

This application is a National Phase entry application of International Patent Application No. PCT/US2017/060046 filed Nov. 3, 2017, which claims priority to U.S. Provisional Patent Application No. 62/417,698, which was filed on Nov. 4, 2016, entitled "REPORTING BAND RELATED CAPABILITIES TO CELLULAR NETWORKS" in the name of Shadi Iskaner et al. and is hereby incorporated by reference in its entirety.

BACKGROUND

Wireless telecommunication networks may include User Equipment (UE) (e.g., smartphones, tablet computers, laptop computers, etc.) Radio Access Networks (RANs) (that often include one or more base stations), and a core network. A UE may connect to the core network by communicating with a base station and registering with the core network. Communications between the UE and the base station may occur over signal carriers corresponding to a particular frequency band.

The rate at which information may be communicated between the UE and the base station may depend on several factors, including the number of carriers being used. For example, while the UE and base station may communicate with one another via a single carrier, in other scenarios, a technique commonly referred to as Carrier Aggregation (CA) may be implemented, whereby the UE and base station may use multiple carriers to communicate with one another. Implementing Carrier Aggregation may include the UE informing the base station about the bands that the UE may use for carrier aggregation purposes, and the base station allocating carriers to the UE accordingly.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
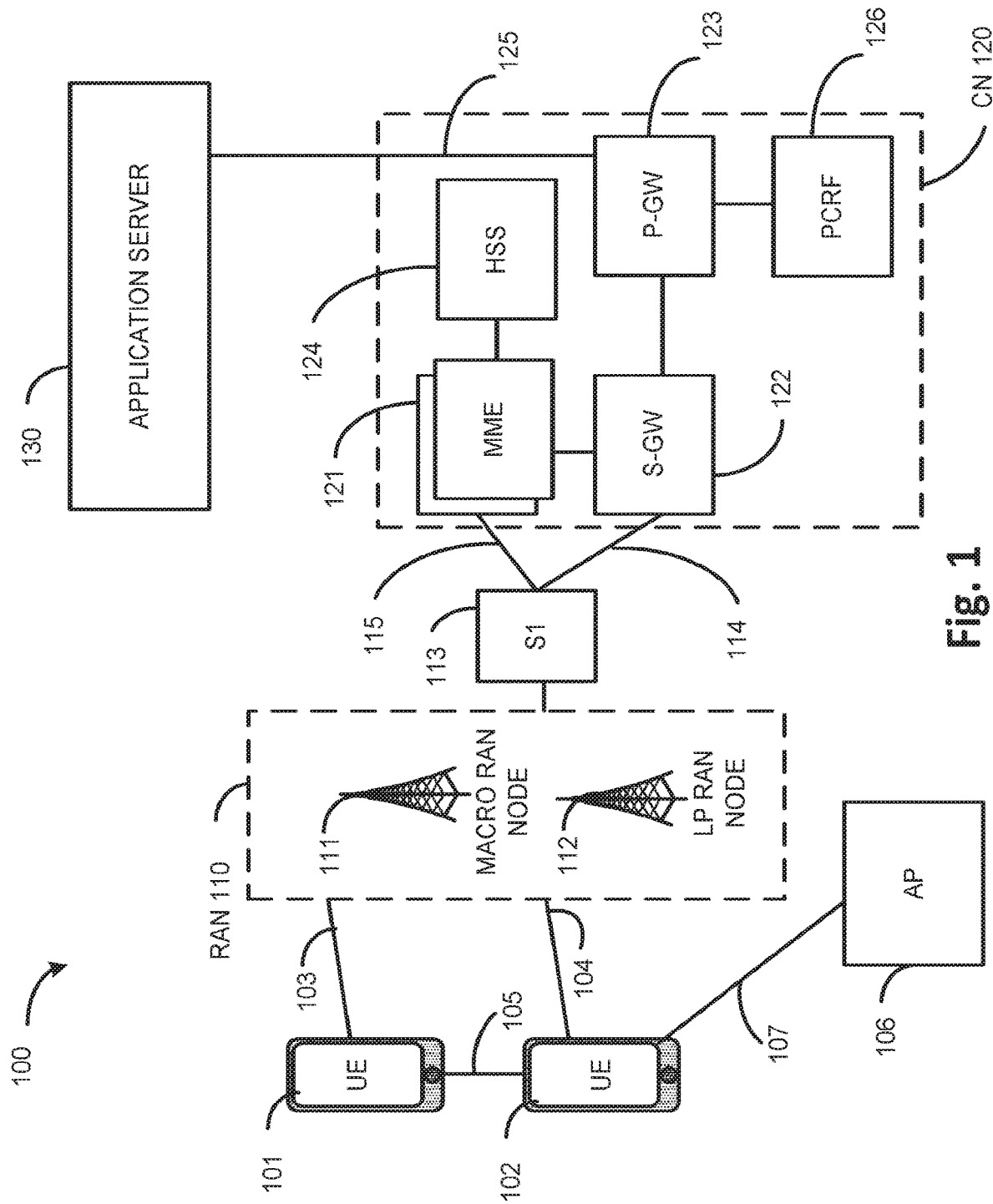
FIG. 1 illustrates an architecture of a system of a network in accordance with some embodiments.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

A User Equipment (UE) may communicate with a base station of a wireless telecommunication network via a carrier signal (referred to herein as "carrier") corresponding to a particular frequency band (referred to herein as "band"). The rate at which information may be communicated between the UE and the base station may depend on the number of carriers that the UE and the base station use to communicate with one another. In some scenarios, the UE and base station may only use one carrier to communicate with one another, while in other scenarios, the UE and base station may use multiple carriers to communicate with one another. In such a scenario, the carriers may correspond to multiple, distinct bands, referred to herein as a combination of bands. A "band combination," as described herein, may refer to two or more bands that may be used to establish multiple carriers between a UE and a wireless network.

Techniques that enabling a UE and base station to communicate with one another using multiple carriers may include Carrier Aggregation, Licensed-Assisted Access (LAA), Dual Connectivity, etc. As one example, Carrier Aggregation may enable the UE and base station to use multiple carriers from a licensed spectrum (e.g., Long-Term Evolution (LTE) carrier). As another example, LAA may enable the UE to communicate with the wireless network using a carrier corresponding to a band from the licensed spectrum and a carrier corresponding to a band from the unlicensed spectrum (e.g., a Wi-Fi® carrier). Such techniques may be to herein generally as "carrier aggregation."

Carrier aggregation techniques may include the UE informing the wireless network (e.g., the base station) about the bands that the UE is capable of using for carrier aggregation purposes. For instance, per the 3rd Generation Partnership (3GPP) Communication Standard, a UE may send a message to the base station about all of the bands that the UE may use for carrier aggregation along with parameters and other configuration information about using the bands. In response, the base station may determine which bands to use for carrier aggregation purposes regarding the UE. However, with the development of sophisticated UEs with greater processing capacity, multiple antennas, more memory, etc., and multiple carrier aggregation techniques, the quantity of bands that a UE may support for carrier aggregation has increased significantly. As such, the amount of information that a UE may communicate to a base station regarding the bands that the UE may support for carrier aggregation purposes may be so large as to create issues of unreliability and inefficiency.

For example, the amount of information that a UE may communicate to a base station, regarding the bands that the UE may use for carrier aggregation, may be so large that the base station may not be able to receive the entire message before expiry of pre-set timers. Additionally, the amount of information may be so large that the base station may not be able to decode the message or otherwise process the message because of implementation-dependent memory limitations. In addition, a particular base station may only support 1-10 different band combinations, while the UE may support over a hundred different band combinations. As such, even when the base station receives and process the information about the bands supported by the UE, many of the band combinations may be irrelevant to the base station.

Techniques described herein may be used to enable UEs to efficiently and reliably report band combinations to a wireless network. For example, an enhanced NodeB (eNB) may determine band combinations supported by the eNB (referred to herein as "eNB-supported band combinations"), create a summarized, abbreviated, or otherwise shortened list of the eNB-supported band combinations, and communicate the eNB-supported band combinations to the UE. The UE may use the eNB-supported band combinations to determine whether the UE and the eNB support any of the same band combinations, create a summarized, abbreviated, or otherwise shortened list of such band combinations (at times referred to herein as "common band combinations"), and report or otherwise communicate the common band combinations to the eNB. Since the common band combinations reported by the UE are limited to the eNB-supported band combinations, the amount of information communicated from the UE to the eNB may be relatively small, and therefore provide a much more efficient and reliable way for band combination capabilities to be reported in a telecommunication network. While some of the techniques, described herein, may be described with a context that may correspond to fourth generation (4G) technologies of the 3rd Generation Partnership Project (3GPP) (e.g., Long-Term Evolution (LTE)), the techniques described herein may also be applied to contexts and scenarios involving fifth generation 5G technologies, New Radio (NR) technologies, and more.

FIG. 1 illustrates an architecture of a system 100 of a network in accordance with some embodiments. The system 100 is shown to include UE 101 and a UE 102. The UEs 101 and 102 are illustrated as smartphones (e.g., handheld touch-screen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
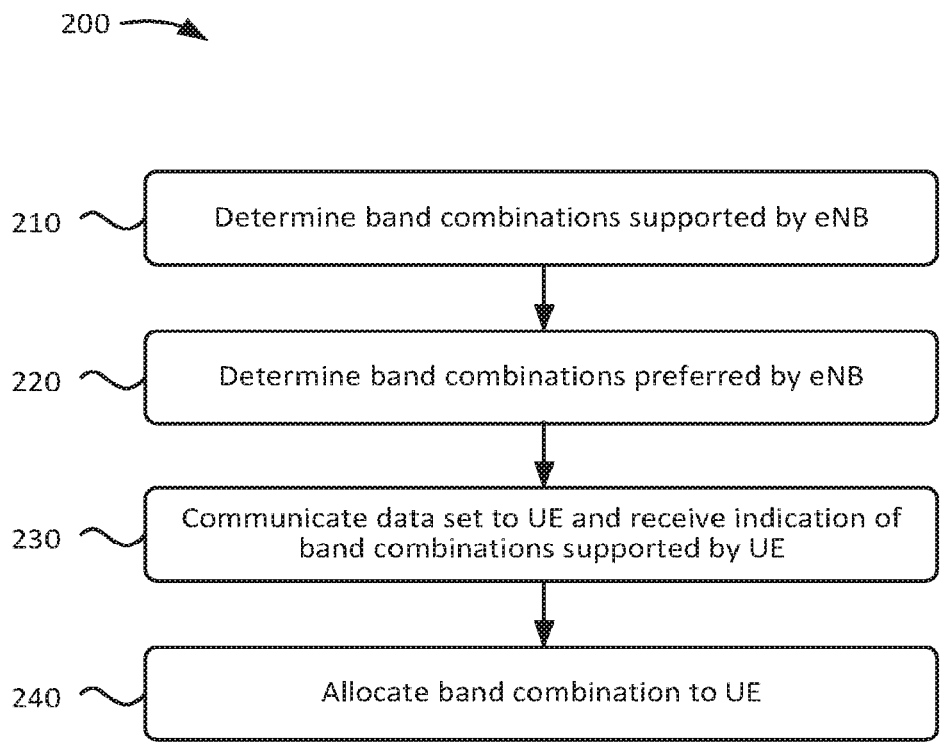
FIG. 2 is a flowchart of an example process for reporting band capabilities within a telecommunication network.

FIG. 2 is a flowchart of an example process 200 for reporting band capabilities within a telecommunication network. Process 200 may be implemented by an eNB. In some embodiments, one or more of the operations described in FIG. 2 may be performed in whole, or in part, by another device, such as AP 106, MME 121, etc. FIG. 2 is described below with reference to FIG. 3. In some embodiments, example process 200 may be performed by an eNB with respect to a particular UE. Additionally, if/when the UE registers with the network in a different area with different band combination support, the network (e.g., a different eNB) may perform another iteration of example process 200 of FIG. 2 and/or another process similar thereto.

As shown, process 200 may include determining band combinations supported by an eNB (block 210). For example, when an eNB is initially deployed in a network (e.g., setup in a particular location, connected to CN 120, configured by a technician, etc.) the eNB may receive information describing the band combinations supported by the eNB. In some embodiments, the eNB may also, or alternatively, receive such information via a subsequent update, reconfiguration procedure, redeployment procedure, etc. In some embodiments, the eNB may also, or alternatively, be provided with a list of bands supported by the eNB, and the eNB may determine the band combinations supported by the eNB by applying one or more rules, instructions, etc., to the list of bands. Each band combination may include a band identifier (ID) (e.g., an LTE band number) for each band in the band combination. In some embodiments, a band combination may be represented in a different manner. For example, the eNB may store records of pre-defined band combinations and corresponding attributes, which are each associated with a unique ID for the band combination.

Process 200 may also include determining which band combinations are preferred by the eNB (block 220). For instance, the eNB may implement one or more tools or techniques to determine which band combinations are preferred with respect to having UEs communicate with the eNB via multiple carriers. Examples of such tools or techniques may include prioritizing band combinations with respect to one another, selecting only a certain number of band combinations, and/or creating a data set that best describes the selected band combinations.

Figure 3:
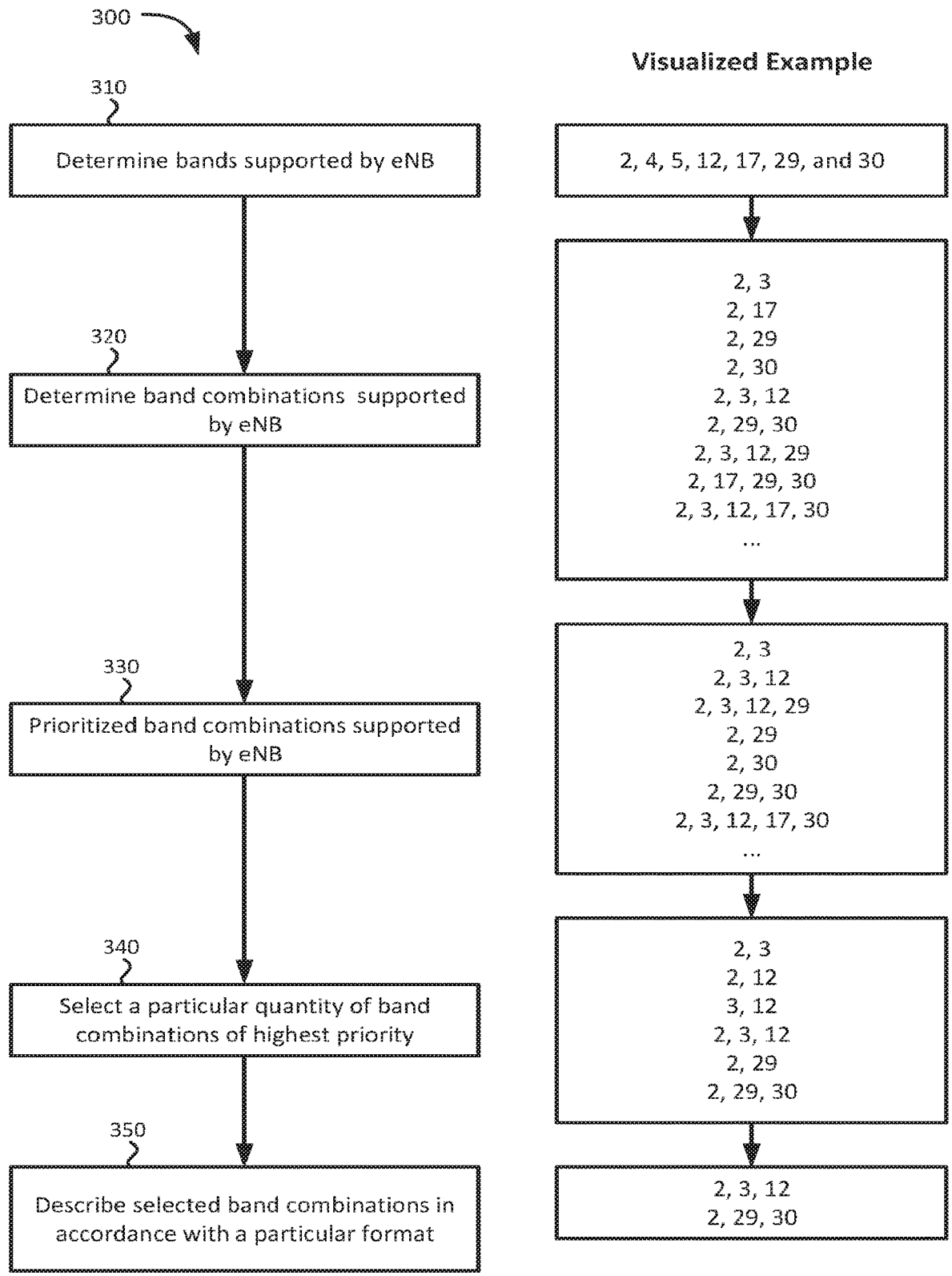
FIG. 3 is a flowchart of an example process for determining band combinations preferred by an enhanced NodeB (eNB)

FIG. 3 is a flowchart of an example process for determining band combinations preferred by an eNB. In some embodiments, one or more of the operations described in FIG. 3 may be performed in whole, or in part, by another device, such as AP 106, MME 121, etc. Process 300 may be implemented by an eNB. Additionally, process 300 is provided in parallel with a non-limiting, visualized example to help in the description of process 300.

As shown, process 300 may include determining the bands that are supported by the eNB (block 310) and determining band combinations supported by the eNB (block 320). These operations may be similar to those described above with reference to blocks 210 and 220 of FIG. 2, and will therefore not be described again in detail again. Blocks 310 and 320 are provided in FIG. 3 to provide additional context for the corresponding example of FIG. 3. As shown, the eNB may determine that the bands supported by the eNB include bands 2, 4, 5, 12, 17, 29, and 30. Additionally, the band combinations supported by the eNB may include a band combination of band 2 and band 3 (annotated as 2, 3); a band combination of band 2 and band 17 (annotated as 2, 17); a band combination of band 2 and band 29 (annotated as 2, 29); and so on.

Process 300 may additionally include prioritizing the band combinations supported by the eNB (block 330). For example, the eNB may rank each of the supported band combinations with respect to one another. In some embodiments, the eNB may prioritize the supported band combinations based on an explicit priority provided by a technician (e.g., when the eNB is initially deployed, as part of an update procedure, etc.). The priority may be based on characteristics of the band combinations themselves, such as which band combinations include bands that are more or less likely to interfere with one another, which bands are most capable of providing service to UEs 101 in a particular situation (e.g., a given distance from the eNB, inside a building, underground, etc.), which bands are better or worse for a given type of traffic or Quality of Service (QoS) requirement, etc.

In some embodiments, the eNB may also, or alternatively, determine priority dynamically (e.g., during run-time and/or based on one or more factors or conditions). Examples of such factors and/or conditions may include a current allocation of carriers to UEs 101 communicating with the eNB, how much or little allocated carriers are being used by UEs 101, a level of congestion and/or wireless interference within a coverage area of the eNB, etc. In some embodiments, the eNB may receive initial prioritization information from a technician and modify/update band combination priorities based on network factors and conditions. As shown, the band combination of band 2 and band 3 may have the highest priority; the band combination of band 2, band 3, and band 12 may have the second highest priority, the band combination of band 2, band 3, band 12, and band 29 may have the third highest priority, and so on.

Process 300 may also include selecting a particular quantity of band combinations of highest priority (block 340). For example, based on the prioritized list of band combinations, the eNB may select a certain (e.g., a limited) number of the highest priority band combinations. The number of band combinations that are selected may be based on configuration information received by the eNB from a technician (e.g., during deployment, an update procedure, etc.). As shown, the selected band combinations may include six different band combinations, including the band combination of band 2 and band 3; the band combination of band 2, band 12; the band combination of band 3, band 12; the band combination of band 2, band 3, and band 12, the band combination of band 2 and band 29, the band combinations of band 2 and band 30, and so on.

Process 300 may include describing the selected band combinations in accordance with a particular format (block 350). As shown, the eNB may determine that some or all of the selected band combinations may be described in a highest order format and proceed to generate a data set that represents the selected band combinations accordingly. A highest order format, as described herein, may include a single superset that includes multiple subsets. For example, the band combination of 2, 3; the band combination of 2, 12; the band combination of 3, 12; and the band combination of 2, 3, 12, each fall within the highest order band combination of 2, 3, 12, since 2, 3, 12 includes each of 2, 3; 2, 12; 3, 12; and 2, 3, 12. Similarly, the band combination of 2, 29; and the band combination of 2, 29, 30, each fall within the highest order band combination of 2, 29, 30. Therefore, the eNB may represent the six selected band combinations with two, highest order band combinations: 2, 3, 12, 29, and 2, 29, 30.

A highest order band combination of 2, 3, 12, 29 may signify to the UE that the eNB may support any combination of the listed bands (e.g., a band combination of 2, 3; a band combination of 2, 12; a band combination of 2, 3, 12; and a band combination of 2, 3, 12, 29. In some embodiments, a highest order band combination may include a bandwidth class (A, B, C) for each band (e.g., 2A, 3A, 12A, 29A). The bandwidth class may indicate a combination of maximum Aggregated Transmission Bandwidth Configuration (ATBC) and maximum number of Component Carriers (CCs) for the band.

Alternatively, the eNB may describe the selected band combinations as two or more groups of bands (e.g., 2, 3, 12, 29, and 2, 29, 30). Band combinations arranged as groups may indicate to the UE that the eNB may support a combination of bands that includes at least one band from each group. For example, a first group of bands 2, 3, 12, 29 and a second group of bands 2, 29, 30, may indicate to the UE that the eNB may support a band combination of 2, 3; 2, 29; 2, 30; 3, 29; 3, 30; and so on. Alternatively, a band combination group may indicate the bands that may be combined in any manner. For example, a band combination group of 2, 3, 12 may indicate that the eNB may support a band combination of 2, 3; a band combination of 2, 12; a band combination of 3, 12; and so on.

In some embodiments, prioritizing band combinations, selecting a particular quantity of band combinations, and describing the band combinations according to a particular scheme may be interrelated. For example, the eNB may prioritize band combinations based on the particular quantity of band combinations to be selected. If the eNB is to only select five band combinations, the eNB may only prioritize the top five band combinations. Additionally, or alternatively, if the eNB is to describe band combinations in a highest order format, the eNB may only select the prioritized band combinations that fall within such a format. In some embodiments, the eNB may explicitly describe each band combination (e.g., each of the selected band combination of FIG. 3).

Referring back to FIG. 2, process 200 may include communicating the preferred band combinations to UE 101 and receiving an indication of band combinations supported by UE 101 (block 230). For example, the eNB may inform UE 101 about the band combinations that are preferred by the eNB. In some embodiments, the eNB may provide additional information regarding the preferred band combinations, such as bandwidth class information (e.g., class A, class B, class C). In some embodiments, the eNB may do so via a UE Capability Enquiry message (sometimes referred to as a "ueCapabilityEnquiry"). In some embodiments, the eNB may also, or alternatively, provide UE 101 with the band combination information in a Radio Resource Control (RRC) message. In response, the eNB may receive an indication of the band combinations supported by UE 101. As described in detail with reference to FIGS. 4 and 5. The band combinations supported by UE 101 may be based on the preferred band combinations sent to UE 101 by the eNB.

Process 200 may also include allocating a band combination to the UE (block 240). For example, after receiving the band combinations supported by UE 101, which may have been based on the preferred band combinations from the eNB, the eNB may proceed to allocate wireless resources to UE 101. This may the eNB reserving carriers of the bands for UE 101, informing UE 101 that UE 101 may begin using the reserved carriers, and/or communicating with UE 101 via the allocated carriers.

In some embodiments, UE 101 may not have any band combinations in common with the preferred band combinations from the eNB. In such a scenario, UE 101 may inform the eNB accordingly (e.g., via a UE Capability Information message), and the eNB and UE 101 may fallback to legacy solutions, such as the eNB requesting UE 101 to provide all of the bands for which UE 101 may implement carrier aggregation.

Figure 4:
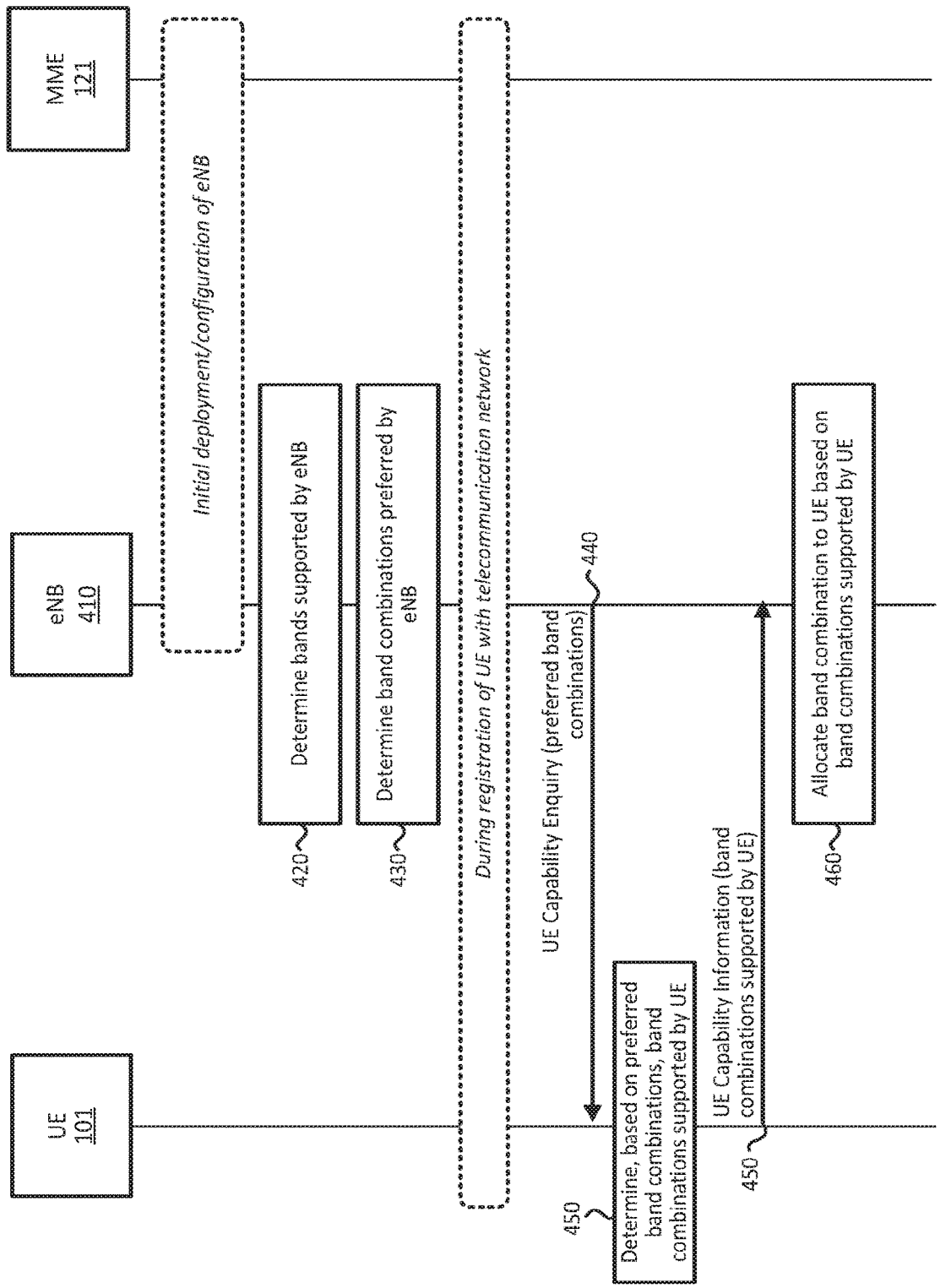
FIG. 4 is a sequence flow diagram of an example process for reporting band capabilities within a telecommunication network.

FIG. 4 is a sequence flow diagram of an example process for reporting band capabilities within a telecommunication network. As shown, the example of FIG. 4 may include UE 110, eNB 410, and MME 121. The example of FIG. 4 is provided as a non-limiting example. In practice, the example of FIG. 4 may include fewer, additional, alternative, operations or functions. Additionally, one or more of the operations or functions of FIG. 4 may be performed by fewer, additional, or alternative devices, which may include one or more of the devices described above with reference to FIG. 1.

As shown, after or during an initial deployment of eNB 410, eNB 410 may determine the bands that are supported by eNB 410 (at 420). This may include the bands that eNB 410 may use to communicate with UEs 101. Additionally, based on the bands supported by eNB 410, eNB 410 may determine band combinations that are preferred by eNB 410 (at 430). As described above, this may include determining possible band combinations, prioritizing band combinations, selecting band combinations of the highest priority, and/or representing the selected band combinations explicitly, in a highest order format, a group format, or a combination thereof.

Subsequently, UE 101 may communicate with eNB 410 to register with MME 121. During, or subsequent to, the registration procedure, eNB 410 may communicate the preferred band combinations to UE 101 (at 440). As shown, eNB 410 may do so in a UE Capability Enquiry message. In response, UE 101 may determine, based on the preferred band combinations from eNB 410, band combinations that are supported by UE 101. An example of how UE 101 may do so is discussed below with reference to FIG. 5.

After UE 101 has used the preferred band combinations from eNB 410 to determined band combinations that are supported by UE 101, UE 101 may communicate the determined band combinations to eNB 410 (at 450). As shown, UE 101 may do so by including, describing, or otherwise representing the band combinations in a UE Capability Information message. In some embodiments, UE 101 may also provide eNB 410 with corresponding parameters and other support information for each band combination. Examples of such information may include contiguous or non-continuous status of each band combination, which bands are intended downlink (DL) and uplink (UL), class information for the band combinations, a number of antennas that UE 101 supports, etc. Upon receiving the band combinations supported by UE 101, eNB 410 may allocate a band combination to UE 101 based on the information from UE 101 (at 460). This may the eNB reserving carriers of the bands for UE 101, informing HE 101 that UE 101 may begin using the reserved carriers, and/or communicating with UE 101 via the allocated carriers.

Figure 5:
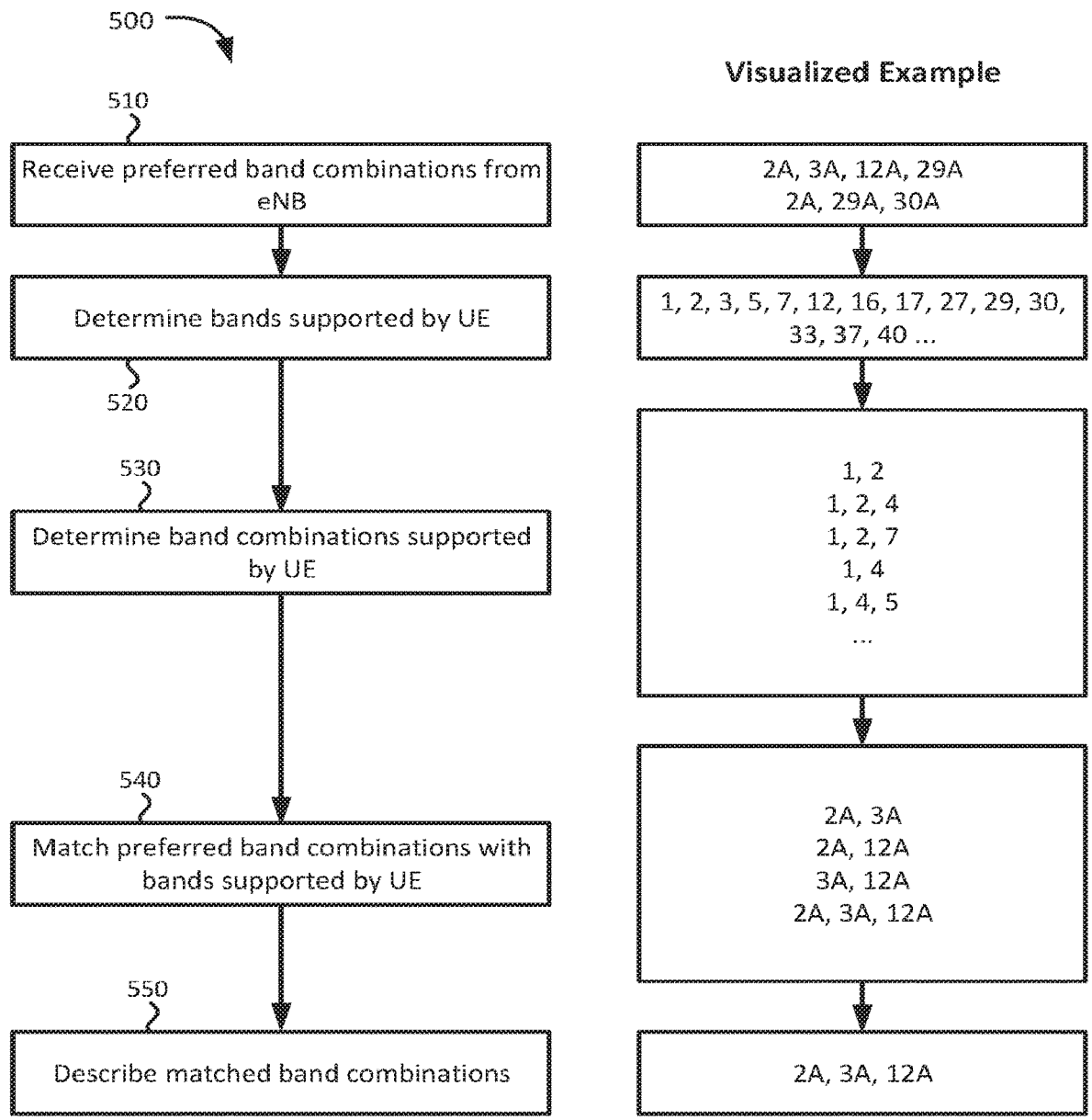
FIG. 5 is a flowchart of an example process for determining band combinations supported by User Equipment (UE) based on preferred band combinations from the eNB.

FIG. 5 is a flowchart of an example process 500 for determining band combinations supported by UE 110 based on preferred band combinations from eNB 410. Process 500 may be implemented by an eNB. In some embodiments, one or more of the operations described in FIG. 5 may be performed in whole, or in part, by another device, such as an AP 106, MME 121, etc. Additionally, process 500 is provided in parallel with a non-limiting, visualized example to help in the description of process 500. In some embodiments, example process 500 may be performed by an eNB with respect to a particular UE. Additionally, if/when the UE registers with the network in a different area with different band combination support, the network (e.g., the new/different eNB) may perform another iteration of example process 500 of FIG. 5 and/or another process similar thereto.

Process 500 may include receiving preferred band combinations from eNB 410 (block 510). For example, eNB 410 may communicate, to UE 101, a list of band combinations that are preferred by eNB 410. As shown, UE 101 may receive the band combination 2, 3, 12, 29 and the band combination 2, 3, 30. As described above, preferred band combinations may be presented as highest order band combinations or groups of band combinations. For purposes of describing FIG. 5, assume that the preferred band combinations of FIG. 3 are provided as highest order band combinations, which may indicate to UE 101 that eNB 410 may support any combination of bands from the band combination 2, 3, 12, 29 (e.g., 2,3; 3,12; 2,12,29; etc.); and any combination of bands from the band combination 2, 29, 30 (e.g., 2,29; 29,30, 2,29,30, etc.).

Process 500 may also include determining bands supported by UE 101 (block 520) and/or determine band combinations supported by UE 101 (block 530). For instance, UE 101 may determine which bands that UE 101 is configured to use to communicate with eNB 410 and/or which band combinations that UE 101 may use in a carrier aggregation scenario. As shown, UE 101 may determine that UE 101 supports bands 1, 2, 4, 5, 7, 12, 16, 17, 27, 29, 30, 332, 37, 40, and more. UE 101 may also determine that UE 101 may support band combinations 1, 2; 1, 2, 4; 1, 2, 7; 1, 4; 1, 4, 5; and more. In some embodiments, UE 101 may store a list, table, or other type of data structure/arrangement, of band combinations supported by UE 101 and may determine band combinations supported by UE 101 by accessing the list.

Process 500 may also include matching the preferred band combinations with the band supported by UE 101 (block 540). For example, UE 101 may determine which band combinations are supported by eNB 410 based on the preferred band combination information from eNB 410. For example, if the preferred band combination information includes a highest order format, UE 101 may determine that any combination of bands from the same highest order group may be supported by eNB 410. A first highest order band combination of bands 1, 2, 3, and 4, and a second highest order band combination of 11, 12, 13, and 14 may indicate that eNB 410 may support a band combination of 1, 2, a band combination of 1, 3, a band combination of 12, 14, a band combination of 12, 13, and so on, but not a band combination of 1, 11, a band combination of 1, 13, a band combination of 2, 14, etc. In some embodiments, highest order band combinations may also indicate the class (e.g., class A, B, C) corresponding to each band.

In another example, if the preferred band combination information includes groups of band combinations, UE 101 may determine that any combination of bands from different band combination groups may be supported by eNB 410. For instance, a band combination group of 1, 2, 3, and 4, and a second band combination group of 11, 12, 13, and 14, may indicate that Enb 410 may support a band combination of 1, 11, a band combination of 1, 12, a band combination of 2, 12, a band combination of 3, 14, and so on, but not for example, a band combination of 1, 2, a band combination of 11, 12, etc.

After determining which band combinations are supported by eNB 410, UE 101 may compare the eNB-supported band combinations to the band combinations supported by UE 101, to identify band combinations that are supported by both eNB 410 and UE 110. In some embodiments, UE 101 may also match band combinations based on band class information provided with the preferred band combinations. For example, if the preferred band combination information pertains to a particular class (e.g., class A, B, or C), a match may occur if/when the band combinations supported by UE 101 also pertain to the same or adequate class information. As shown, assume that UE 101 determines that band combinations 2A, 3A; 2A, 3A, 12A; and 2A, and 29A are described by the preferred band combinations from eNB 410 and found in the band combinations supported by UE 101. As such, a band combination of bands 1, 2, and 3, all of which are class A bands, may be annotated herein as 1A, 2A, 3A.

Process 500 may also include describing the matched band combinations (block 550). For example, UE 101 may analyze the matched band combinations and determine an efficient way to summarize the matched band combinations. As shown, UE 101 may determine that the band combinations supported by UE 101 (e.g., 2A, 3A; 2A, 12A, etc.) are subsets of a band combinations that may be summarized by a superset (e.g., 2A, 3A, 12A). As such, UE 101 may describe all of the matched band combinations with a single band combination that is a superset of the matched band combinations and subset of the preferred band combinations from eNB 410.

Figure 6:
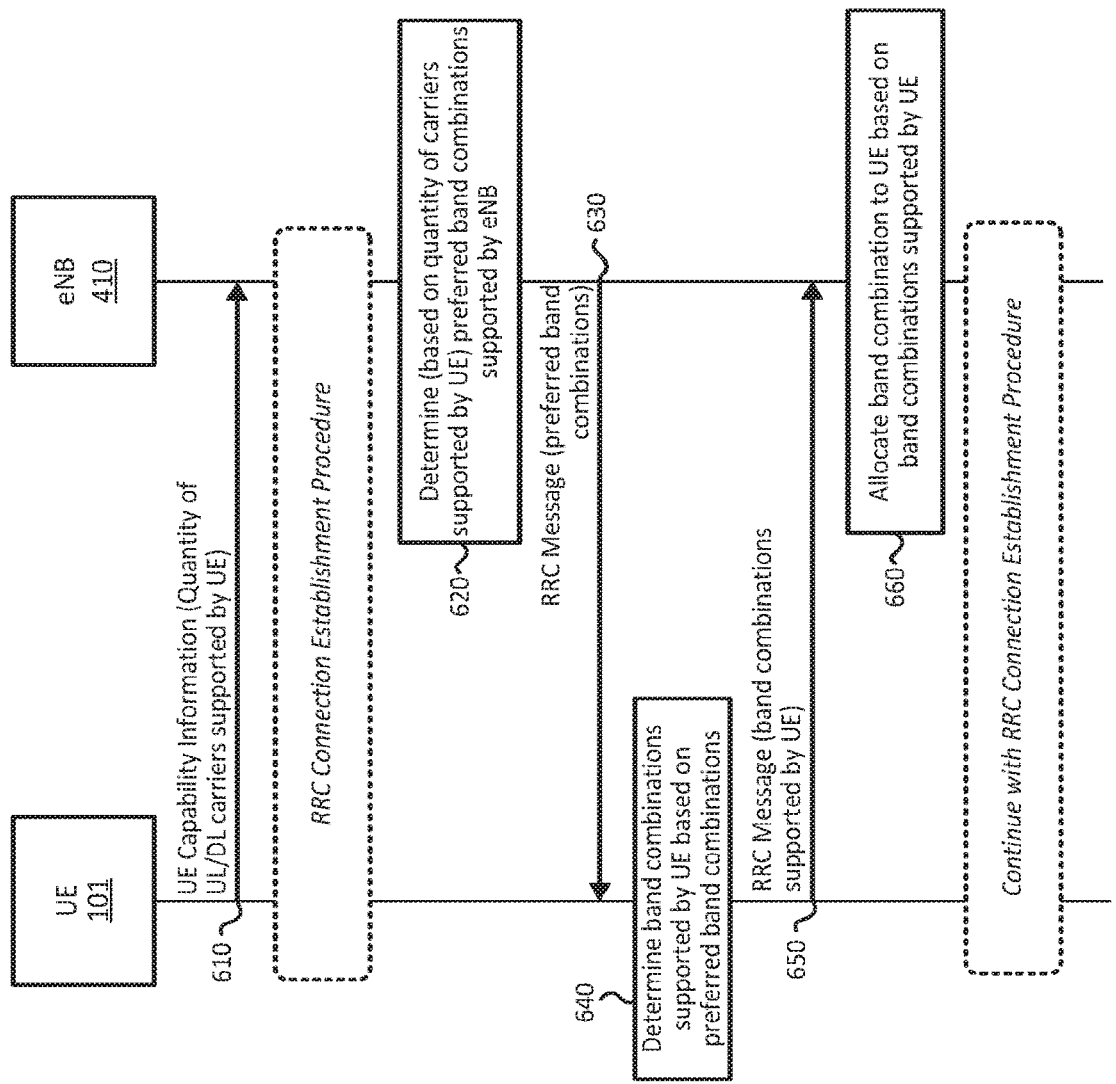
FIG. 6 is a sequence flow diagram of another example process for reporting band capabilities within a telecommunication network.

FIG. 6 is a sequence flow diagram of another example process for reporting band capabilities within a telecommunication network. As shown, the example of FIG. 5 may include UE 110, an eNB, and MME 121. The example of FIG. 6 may include one integration for reporting band capabilities within a telecommunication network. In some embodiments, if/when UE 110 registers with the network in a different area with different band combination support, the network (e.g., a different eNB) may perform another iteration of the example process of FIG. 6 and/or another process similar thereto.

The example of FIG. 6 is provided as a non-limiting example. In practice, the example of FIG. 6 may include fewer, additional, alternative, operations or functions. Additionally, one or more of the operations or functions of FIG. 6 may be performed by fewer, additional, or alternative devices, which may include one or more of the devices described above with reference to FIG. 1. While the example of FIG. 6 is described within a context that includes an RRC procedure, the techniques described herein are not limited thereto. In practice, the techniques described herein, which may include one or more of the operations presented in FIG. 6, may be applied to other contexts as well. For example, UE 101 may report band capabilities, as described herein, to an eNB and/or another type of RAN node (111 or 112) while in CONNECTED mode and/or another mode of operation or context.

As shown, prior to engaging in an RRC procedure, UE 101 may communicate, to eNB 410, a quantity of UL/DL carriers that may be supported by UE 101 (at 610). UE 101 may communicate this information in a UE Capability Information message, which may be part of a process whereby UE 101 registers with the network. Subsequently, UE 101 and eNB 410 may engage in an RRC procedure, such as an RRC Connection Setup procedure. During (or prior to) the procedure, eNB 410 may determine preferred band combinations that are supported and/or preferred by eNB 410 (block 620). The band combinations determined by eNB 410 may be limited to (or otherwise based on) the quantity of UL/DL carriers supported by UE 101.

Additionally, eNB 410 may communicate the preferred band combinations to UE 101 (at 630). As shown, eNB 410 may do so using an RRC message, which may be an existing RRC message (an RRC message also used for other purposes), a new RRC message (e.g., an Evolved RRC (ERRC) message, and/or another type of message or signal (e.g., a 5G message or signal) configured to convey the preferred band combination information to UE 110 during an RRC procedure. In response, UE 101 may determine band combinations that are supported by UE 101 based on the preferred band combinations (at 640). Examples of this are described above with reference to FIG. 5. UE 101 may then communicate, to eNB 410, the band combinations supported by UE 101 via another RRC message (at 650). The RRC message used by UE 101 may be an existing RRC message (an RRC message also used for other purposes) or a new RRC message (e.g., an Evolved RRC (ERRC) message configured to convey the band combinations supported by UE 101 during an RRC procedure. Having received the band combinations supported by UE 101, eNB 410 may later allocate a band combination to UE 101 based on the band combinations supported by UE 101.

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
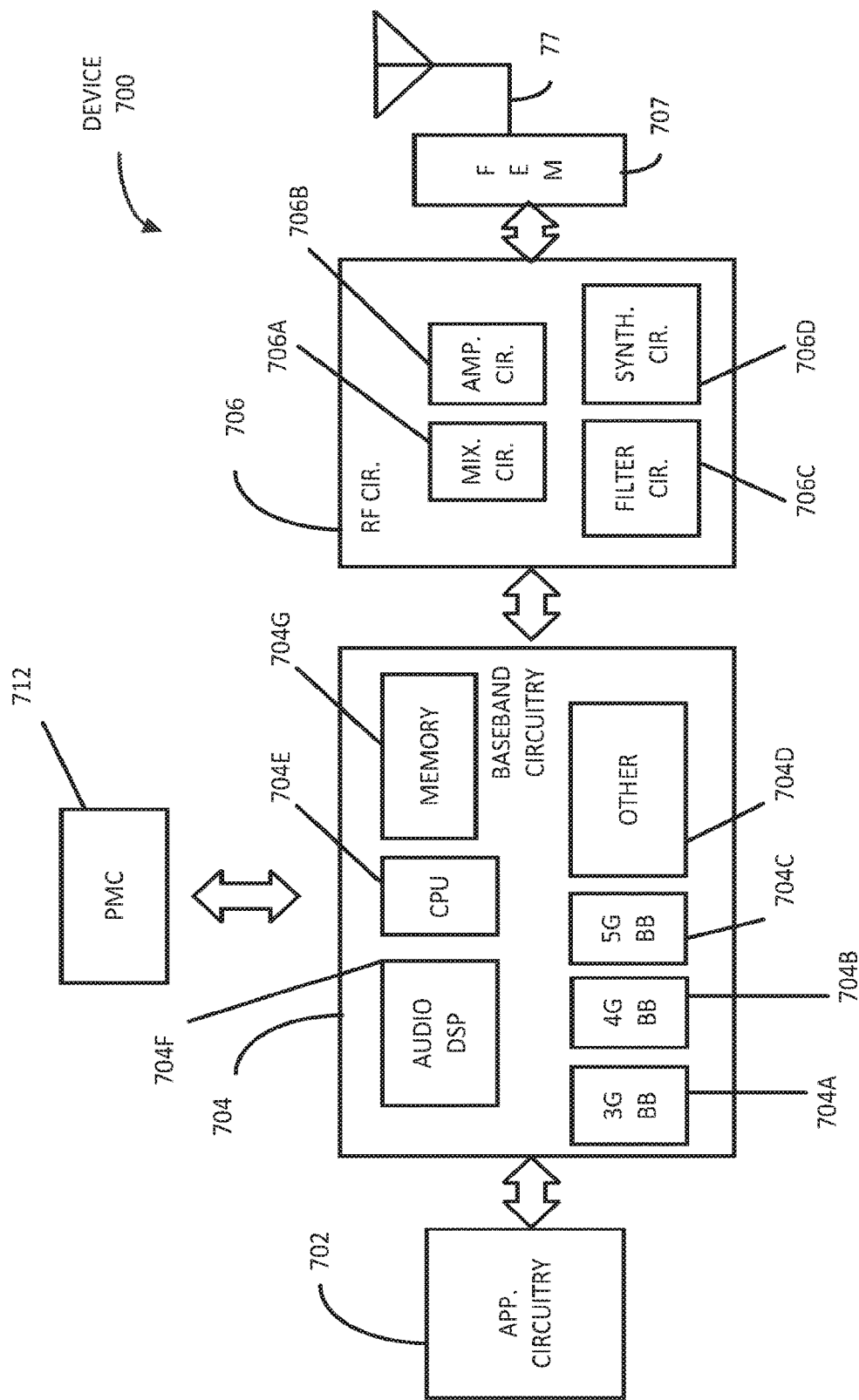
FIG. 7 illustrates example components of a device in accordance with some embodiments.

Embodiments described herein may be implemented into a system using any suitably configured hardware and/or software. FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one. or more single-core or multi-core processors The processor(s) may include any combination of general-purpose processors and dedicated processors (e.g., graphics processors, application. (processors, etc The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions, may include, but are not limited to, signal modulation/demodulation encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented, together such as, for example, on a system on a chip (SOC)

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry RF circuitry 706 may enable communication with wireless networks using modulated electromagnetic radiation through a non-solid medium. In various embodiments, the RF circuitry 706 may include switches, filters, amplifiers, etc. to facilitate the communication with. the wireless network RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
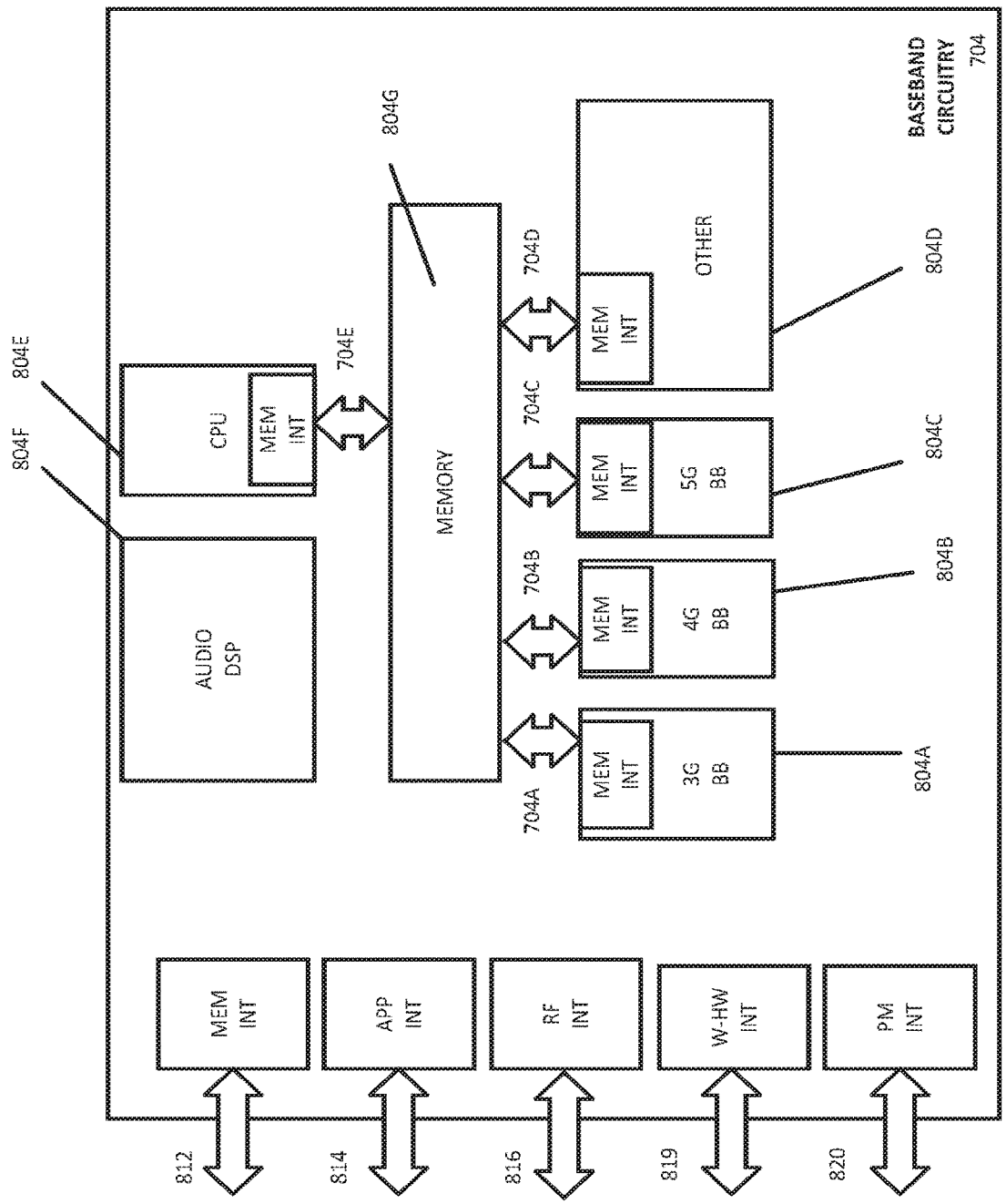
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 804A-804E and a memory 804G utilized by said processors. Each of the processors 804A-804E may include a memory interface, respectively, to send/receive data to/from the memory 804G.

The baseband circuitry 804 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712).

Figure 9:
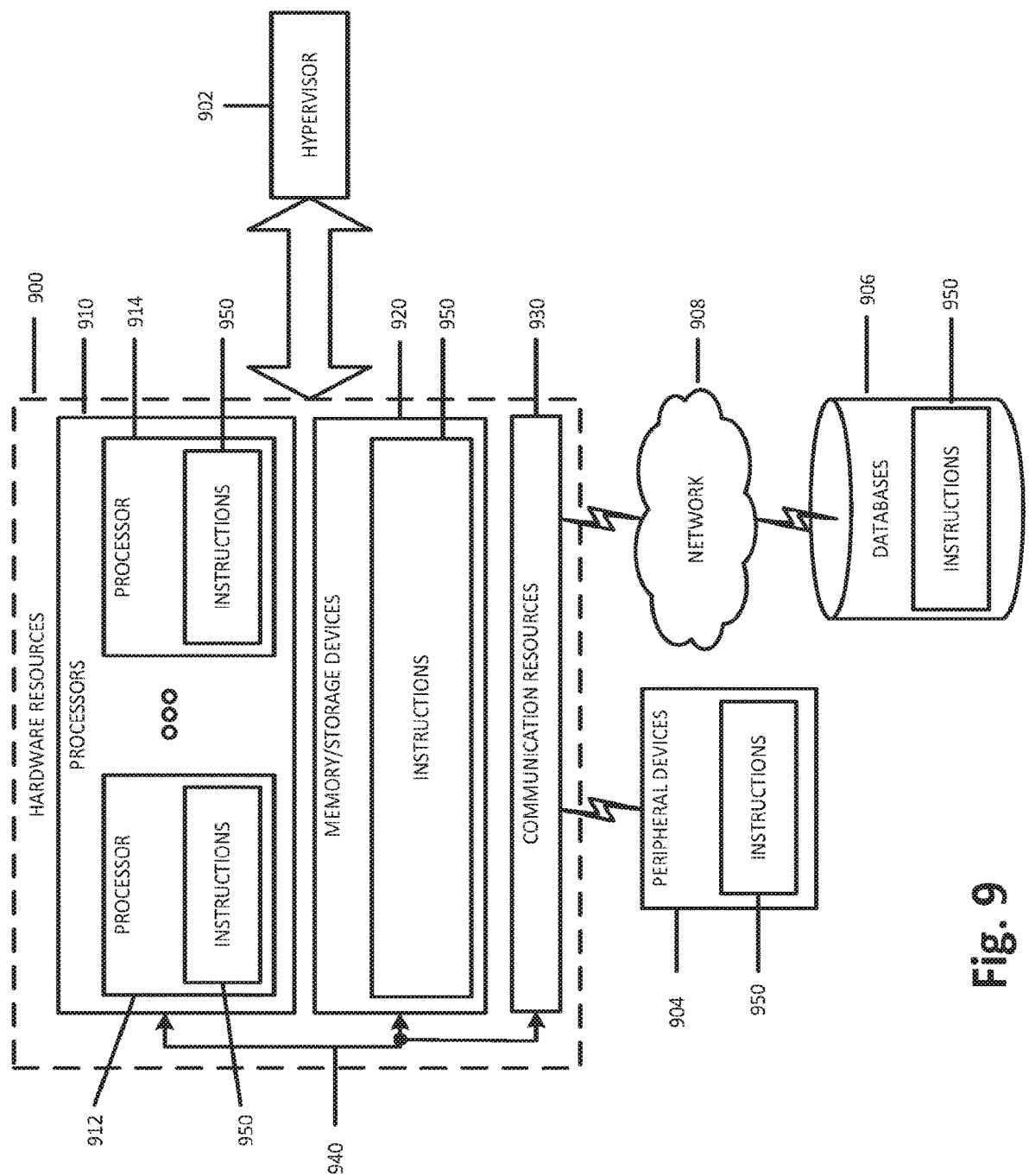
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

A number of examples, relating to embodiments of the techniques described above, will next be given.

In a first example, a base station of a wireless telecommunication network may comprise: a computer-readable memory device storing processor-executable instructions; and one or more processors configured to execute the processor-executable instructions, wherein execution of the processor-executable instructions, by the one or more processors, causes the one or more processors to: determine a plurality of frequency band combinations, each frequency band combination, of the plurality of frequency band combinations, including a plurality of wireless frequency bands supported by the base station for carrier aggregation; communicate, to a User Equipment (UE), an indication of the plurality of frequency band combinations; and receive, from the UE, at least one frequency band combination that corresponds to the plurality of frequency band combinations and is supported by the UE for carrier aggregation.

In example 2, the subject matter of example 1, or any of the examples herein, wherein the indication includes a highest order frequency band combination representing a superset of the plurality of frequency band combinations.

In example 3, the subject matter of example 2, or any of the examples herein, wherein the at least one frequency band combination includes a subset of the superset of the plurality of frequency band combinations.

In a fourth example, a computer-readable memory device may store processor-executable instructions; and one or more processors configured to execute the processor-executable instructions, wherein execution of the processor-executable instructions, by the one or more processors, causes the one or more processors to: receive, from a base station, an indication of a plurality of frequency band combinations, each frequency band combination, of the plurality of frequency band combinations, including a plurality of wireless frequency bands supported by the base station for carrier aggregation; determine, based on the indication, at least one frequency band combination that corresponds to the plurality of frequency band combinations and that is supported by the UE for carrier aggregation; and communicate the at least one frequency band combination to the base station In example 5, the subject matter of example 4, or any of the examples herein, wherein the indication includes a highest order frequency band combination representing a superset of the plurality of frequency band combinations.

In example 6, the subject matter of example 5, or any of the examples herein, wherein the at least one frequency band combination includes a subset of the superset of the plurality of frequency band combinations.

In a seventh example, a device according to example 1 or 4, wherein the at least one frequency band combination includes a highest order frequency band combination representing a plurality of frequency band combinations supported by the UE and the base station.

In a eighth example, a device according to example 1 or 4, wherein the indication includes a plurality of band identifiers, corresponding to the plurality of frequency bands, arranged in groups of band identifiers to indicate which frequency bands, of the plurality of frequency bands, may be combined to create a frequency band combination of the plurality of frequency band combinations.

In a ninth example, a device according to example 1 or 4, wherein the indication includes a list of the plurality of frequency band combinations.

In a tenth example, a computer-readable medium may contain program instructions for causing one or more processors, associated with a base station, to: determine a plurality of frequency band combinations, each frequency band combination, of the plurality of frequency band combinations, including a plurality of wireless frequency bands supported by the base station for carrier aggregation; communicate, to a User Equipment (UE), an indication of the plurality of frequency band combinations; and receive, from the UE, at least one frequency band combination that corresponds to the plurality of frequency band combinations and is supported by the UE for carrier aggregation.

In example 11, the subject matter of example 10, or any of the examples herein, wherein the indication includes a highest order frequency band combination representing a superset of the plurality of frequency band combinations.

In example 12, the subject matter of example 10, or any of the examples herein, wherein the at least one frequency band combination includes a subset of the superset of the plurality of frequency band combinations.

In a thirteenth example, a computer-readable medium may contain program instructions for causing one or more processors, associated with a User Equipment (UE), to: receive, from a base station, an indication of a plurality of frequency band combinations, each frequency band combination, of the plurality of frequency band combinations, including a plurality of wireless frequency bands supported by the base station for carrier aggregation; determine, based on the indication, at least one frequency band combination that corresponds to the plurality of frequency band combinations and is supported by the UE for carrier aggregation; and communicate the at least one frequency band combination to the base station.

In example 14, the subject matter of example 13, or any of the examples herein, wherein the indication includes a highest order frequency band combination representing a superset of the plurality of frequency band combinations.

In example 16, the subject matter of example 10 or 13, or any of the examples herein, wherein the at least one frequency band combination includes a subset of the superset of the plurality of frequency band combinations.

In example 16, the subject matter of example 10 or 13, or any of the examples herein, wherein the at least one frequency band combination includes a highest order frequency band combination representing a plurality of frequency band combinations supported by the UE and the base station.

In example 17, the subject matter of example 10 or 13, or any of the examples herein, wherein the indication includes a plurality of band identifiers, corresponding to the plurality of frequency bands, arranged in groups of band identifiers to indicate which frequency bands, of the plurality of frequency bands, may be combined to create a frequency band combination of the plurality of frequency band combinations.

In example 18, the subject matter of example 10 or 13, or any of the examples herein, wherein the indication includes a list of the plurality of frequency band combinations.

In a nineteenth example, a base station of a wireless telecommunication network may comprise: means for determining a plurality of frequency band combinations, each frequency band combination, of the plurality of frequency band combinations, including a plurality of wireless frequency bands supported by the base station for carrier aggregation; means for communicating, to a User Equipment (UE), an indication of the plurality of frequency band combinations; and means for receiving, from the UE, at least one frequency band combination that corresponds to the plurality of frequency band combinations and is supported by the UE for carrier aggregation.

In example 20, the subject matter of example 19, or any of the examples herein, wherein the indication includes a highest order frequency band combination representing a superset of the plurality of frequency band combinations.

In example 21, the subject matter of example 20, or any of the examples herein, wherein the at least one frequency band combination includes a subset of the superset of the plurality of frequency band combinations.

In a twenty second example, a User Equipment (UE) may comprise: means for receiving, from a base station, an indication of a plurality of frequency band combinations, each frequency band combination, of the plurality of frequency band combinations, including a plurality of wireless frequency bands supported by the base station for carrier aggregation; means for determine, based on the indication, at least one frequency band combination that corresponds to the plurality of frequency band combinations and is supported by the UE for carrier aggregation; and means for communicate the at least one frequency band combination to the base station In example 23, the subject matter of example 22, or any of the examples herein, wherein the indication includes a highest order frequency band combination representing a superset of the plurality of frequency band combinations.

In example 24, the subject matter of example 23, or any of the examples herein, wherein the at least one frequency band combination includes a subset of the superset of the plurality of frequency band combinations.

In a twenty-fifth example, a device according to example 19 or 22, wherein the at least one frequency band combination includes a highest order frequency band combination representing a plurality of frequency band combinations supported by the UE and the base station.

In a twenty-sixth example, a device according to example 19 or 22, wherein the indication includes a plurality of band identifiers, corresponding to the plurality of frequency bands, arranged in groups of band identifiers to indicate which frequency bands, of the plurality of frequency bands, may be combined to create a frequency band combination of the plurality of frequency band combinations.

In a twenty-seventh example, a device according to example 19 or 22, wherein the indication includes a list of the plurality of frequency band combinations.

In a twenty-eighth example, a method performed by a base station may comprise: determining, by the base station, a plurality of frequency band combinations, each frequency band combination, of the plurality of frequency band combinations, including a plurality of wireless frequency bands supported by the base station for carrier aggregation; communicating, by the base station and to a User Equipment (UE), an indication of the plurality of frequency band combinations; and receiving, by the base station and from the UE, at least one frequency band combination that corresponds to the plurality of frequency band combinations and is supported by the UE for carrier aggregation In example 29, the subject matter of example 28, or any of the examples herein, wherein the indication includes a highest order frequency band combination representing a superset of the plurality of frequency band combinations.

In example 30, the subject matter of example 29, or any of the examples herein, wherein the at least one frequency band combination includes a subset of the superset of the plurality of frequency band combinations.

In a thirty-first example, a method performed by a User Equipment (UE) may comprise: determining a plurality of frequency band combinations, each frequency band combination, of the plurality of frequency band combinations, including a plurality of wireless frequency bands supported by the base station for carrier aggregation; communicating, to a User Equipment (UE), an indication of the plurality of frequency band combinations; and receiving, from the UE, at least one frequency band combination that corresponds to the plurality of frequency band combinations and is supported by the UE for carrier aggregation.

In example 32, the subject matter of example 31, or any of the examples herein, wherein the indication includes a highest order frequency band combination representing a superset of the plurality of frequency band combinations.

In example 33, the subject matter of example 32, or any of the examples herein, wherein the at least one frequency band combination includes a subset of the superset of the plurality of frequency band combinations.

In a thirty-fourth example, a method according to example 28 or 31, wherein the at least one frequency band combination includes a highest order frequency band combination representing a plurality of frequency band combinations supported by the UE and the base station.

In a thirty-fifth example, a method according to example 28 or 31, wherein the indication includes a plurality of band identifiers, corresponding to the plurality of frequency bands, arranged in groups of band identifiers to indicate which frequency bands, of the plurality of frequency bands, may be combined to create a frequency band combination of the plurality of frequency band combinations.

In a thirty-sixth example, a method according to example 28 or 31, wherein the indication includes a list of the plurality of frequency band combinations.

In a thirty-seventh example, a baseband processor of a base station of a wireless telecommunication network may comprise: an interface to radio frequency (RF) circuitry; and one or more processors that are controlled to: determine a plurality of frequency band combinations, each frequency band combination, of the plurality of frequency band combinations, including a plurality of wireless frequency bands supported by the base station for carrier aggregation; communicate, to a User Equipment (UE), via the interface to RF circuitry, an indication of the plurality of frequency band combinations; and receive, from the UE, via the interface to RF circuitry, at least one frequency band combination that corresponds to the plurality of frequency band combinations and is supported by the UE for carrier aggregation.

In example 37, the subject matter of example 36, or any of the examples herein, wherein the indication includes a highest order frequency band combination representing a superset of the plurality of frequency band combinations.

In example 38, the subject matter of example 37, or any of the examples herein, wherein the at least one frequency band combination includes a subset of the superset of the plurality of frequency band combinations.

In a thirty-ninth example, a baseband processor of a User Equipment (UE) of a wireless telecommunication network may comprise: an interface to radio frequency (RF) circuitry; and one or more processors that are controlled to: receive, from a base station, via the interface to the RF circuitry, an indication of a plurality of frequency band combinations, each frequency band combination, of the plurality of frequency band combinations, including a plurality of wireless frequency bands supported by the base station for carrier aggregation; determine, based on the indication, at least one frequency band combination that corresponds to the plurality of frequency band combinations and that is supported by the UE for carrier aggregation; and communicate, via the interface to the RF circuitry, the at least one frequency band combination to the base station.

In example 40, the subject matter of example 39, or any of the examples herein, wherein the indication includes a highest order frequency band combination representing a superset of the plurality of frequency band combinations.

In example 41, the subject matter of example 40, or any of the examples herein, wherein the at least one frequency band combination includes a subset of the superset of the plurality of frequency band combinations.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2-6 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus of a base station comprising:
an interface to radio frequency (RF) circuitry; and
one or more processors that are controlled to:
determine a plurality of frequency band combinations, each frequency band combination, of the plurality of frequency band combinations, including a plurality of wireless frequency bands supported by the base station for carrier aggregation;
determine from the plurality of frequency band combinations a preferred subset of frequency band combinations based upon a prioritization criteria;
communicate, to a User Equipment (UE), via the interface to the RF circuitry, an indication of the preferred subset of frequency band combinations; and
receive, from the UE, via the interface to RF circuitry, at least one frequency band combination that corresponds to the preferred subset of frequency band combinations and is supported by the UE for carrier aggregation.

2. The apparatus of claim 1, wherein the prioritization criteria comprises a characteristic of the frequency band combinations.

3. The apparatus of claim 2, wherein the characteristic comprises a likelihood of a given frequency band combination to interfere with another frequency band combination.

4. The apparatus of claim 2, wherein the characteristic comprises a service provision capability to the UE.

5. The apparatus of claim 2, wherein the determination of the preferred subset of frequency band combinations is made based on the prioritization criteria dynamically.

6. The apparatus of claim 1, wherein the prioritization criteria is configured.

7. An apparatus of a User Equipment (UE) comprising:
an interface to radio frequency (RF) circuitry; and
one or more processors that are controlled to:
receive, from a base station, via the interface to the RF circuitry, an indication of a preferred subset of frequency band combinations selected from a plurality of frequency band combinations based upon a prioritization criteria, each frequency band combination, of the preferred subset of frequency band combinations, including a plurality of wireless frequency bands supported by the base station for carrier aggregation;
determine, based on the indication, at least one frequency band combination that corresponds to the preferred subset of frequency band combinations and that is supported by the UE for carrier aggregation; and
communicate, via the interface to the RF circuitry, the at least one frequency band combination to the base station.

8. The apparatus of claim 7, wherein the prioritization criteria comprises a characteristic of the frequency band combinations.

9. The apparatus of claim 8, wherein the characteristic comprises a likelihood of a given frequency band combination to interfere with another frequency band combination.

10. The apparatus of claim 8, wherein the characteristic comprises a service provision capability to the UE.

11. The apparatus of claim 7, wherein the prioritization criteria is configured.

12. The apparatus of claim 7, wherein the determination of the preferred subset of frequency band combinations is made based on the prioritization criteria dynamically.

13. A non-transitory computer-readable medium containing program instructions for causing one or more processors, associated with a base station, to:
determine a plurality of frequency band combinations, each frequency band combination, of the plurality of frequency band combinations, including a plurality of wireless frequency bands supported by the base station for carrier aggregation;
determine from the plurality of frequency band combinations a preferred subset of frequency band combinations based upon a prioritization criteria;
communicate, to a User Equipment (UE), an indication of the preferred subset of frequency band combinations; and
receive, from the UE, at least one frequency band combination that corresponds to the preferred subset of frequency band combinations and is supported by the UE for carrier aggregation.

14. The non-transitory computer-readable medium of claim 13, wherein the prioritization criteria comprises a characteristic of the frequency band combinations.

15. The non-transitory computer-readable medium of claim 14, wherein the characteristic comprises a likelihood of a given frequency band combination to interfere with another frequency band combination.

16. The non-transitory computer-readable medium of claim 14, wherein the characteristic comprises a service provision capability to the UE.

17. The non-transitory computer-readable medium of claim 13, wherein the prioritization criteria is configured.

18. The non-transitory computer-readable medium of claim 13, wherein the determination of the preferred subset of frequency band combinations is made based on the prioritization criteria dynamically.

19. A non-transitory computer-readable medium containing program instructions for causing one or more processors, associated with a User Equipment (UE), to:
receive, from a base station, an indication of a preferred subset of frequency band combinations selected from a plurality of frequency band combinations based upon a prioritization criteria, each frequency band combination, of the preferred subset of frequency band combinations, including a plurality of wireless frequency bands supported by the base station for carrier aggregation;
determine, based on the indication, at least one frequency band combination that corresponds to the preferred subset of frequency band combinations and is supported by the UE for carrier aggregation; and
communicate the at least one frequency band combination to the base station.

20. The non-transitory computer-readable medium of claim 19, wherein the prioritization criteria comprises a characteristic of the frequency band combinations.

21. The non-transitory computer-readable medium of claim 20, wherein the characteristic comprises a likelihood of a given frequency band combination to interfere with another frequency band combination.

22. The non-transitory computer-readable medium of claim 20, wherein the characteristic comprises a service provision capability to the UE.

23. The non-transitory computer-readable medium of claim 19, wherein the prioritization criteria is configured.

24. The non-transitory computer-readable medium of claim 19, wherein the determination of the preferred subset of frequency band combinations is made based on the prioritization criteria dynamically.

\* \* \* \* \*